United States Patent [19]

Anderson

[11] 4,087,701

[45] May 2, 1978

[54] TRANSFORMER CASCADE FOR POWERING ELECTRONICS ON HIGH VOLTAGE TRANSMISSION LINES

[75] Inventor: John M. Anderson, Scotia, N.Y.

[73] Assignee: General Electric Company, Schenectady, N.Y.

[21] Appl. No.: 767,573

[22] Filed: Feb. 10, 1977

[51] Int. Cl.² .................................... H02J 13/00
[52] U.S. Cl. .......................... 307/149; 340/310 A; 336/173; 324/127; 323/77
[58] Field of Search ............. 307/149; 340/310 R, 340/310 A; 336/173; 323/48, 44 R, 81; 361/332, 334; 324/127; 174/73 R

[56] References Cited

U.S. PATENT DOCUMENTS

| | | | |
|---|---|---|---|
| 3,571,658 | 3/1971 | Knoth | 323/81 |
| 3,943,435 | 3/1976 | DeJarnette | 323/81 |
| 4,012,733 | 3/1977 | Whyte | 340/310 A |

Primary Examiner—L. T. Hix
Assistant Examiner—Stafford D. Schreyer
Attorney, Agent, or Firm—Lawrence D. Cutter; Joseph T. Cohen; Marvin Snyder

[57] ABSTRACT

Power for electronic instrumentation on high voltage transmission lines is provided through a high efficiency cascade of ferrite core transformers operating in the superaudio range. An array of tuning capacitors is provided to neutralize the leakage inductance in each transformer primary and thus present a resistive input impedance throughout the cascade. Unequal turns ratios in the transformers may also be utilized to provide constant resistance, and therefore nearly constant voltage and current along the cascade.

The transformers in a voltage grading network are optimally enclosed within a cylindrical insulator and a dielectric medium, for example, oil or $SF_6$.

16 Claims, 2 Drawing Figures

TRANSFORMER CASCADE FOR POWERING ELECTRONICS ON HIGH VOLTAGE TRANSMISSION LINES

This invention relates to equipment for the efficient transfer of electric power or monitor or control signals between a source at ground potential and electronic circuits which operate at the potential of a high voltage transmission line. More specifically, this invention relates to a cascade of ferrite core transformers which may transfer power or signal informatin at high frequency.

BACKGROUND OF THE INVENTION

Proposed instrumentation systems for high voltage transmission lines include active electronic circuits which operate at transmission line potential to measure circuit parameters, for example, line current. While it is possible in some cases to provide power for these circuits directly from the high voltage ac or dc power transmission system, for example, by way of transformers or shunts, it is usually necessary to provide an alternate, independent power source to operate electronic circuits during line start-up, shutdown, or at other times when line power is not available for practical use. Power for the circuits is typically derived from a source, i.e., low voltage line power, which operates near ground potential and must be transmitted across a large potential difference to the electronics which operate at or near the potential of the high voltage transmission line.

A number of mechanisms have, in prior art, been proposed and developed to accomplish this purpose. Prior art systems have, for example, included a motor operating at ground potential which transmits power via a thin spinning rod to a generator operating at line potential and systems for transmitting power via a beam of ultrasonic energy. Generally, these prior art power transmission mechanisms operate at low efficiencies and have been characterized by poor dependability. A mechanism is, therefore, needed to efficiently and dependably power electronic instrumentation which operates at high potential with respect to ground.

SUMMARY OF THE INVENTION

Power is transmitted from a source at ground potential to instrumentation circuits operating at the potential of a high voltage transmission line through a cascade of transformers, each having relatively low-voltage insulation and a turns ratio of approximately 1:1; operating most advantageously at superaudio frequencies. Capacitive networks balance the inductive reactance of the transformers to provide a pure resistive load at the input of the cascade. The values of these balancing components may vary with position along the cascade to compensate for the effects of leakage inductance in the transformers. In addition, the turns ratios of the transformers may be made to vary from the ideal 1:1 ratio to compensate for progressive change in resistance along the cascade. The cascade may be enclosed within an insulator bushing in, for example, air, oil, or sulfur-hexafluoride and may include grading resistors and capacitors to balance normal potentials and line transients along the cascade. Because the cascade, even if tuned by the capacitor, is relatively broadband, signal or monitor information may be separately or simultaneously transmitted along the cascade. For example, information describing the conditioning of the equipment or for the control of equipment at the line voltage or for monitoring line current may be transmitted in a band of frequencies adjacent to power transmission frequency, or in place of power transmission.

It is, therefore, an object of this invention to provide means for efficiently transmitting relatively low levels of electric power or information across a large potential difference.

Another object of this invention is to provide dependable and efficient means for powering electronic instrumentation on high voltage transmission lines.

BRIEF DESCRIPTION OF THE DRAWINGS

The novel features believed characteristic of the present invention are set forth in the appended claims. The invention itself, together with further objects and advantages thereof, may best be understood by reference to the following detailed description taken in connection with the appended drawings in which:

DESCRIPTION OF THE PREFERRED EMBODIMENT

Figure 1:
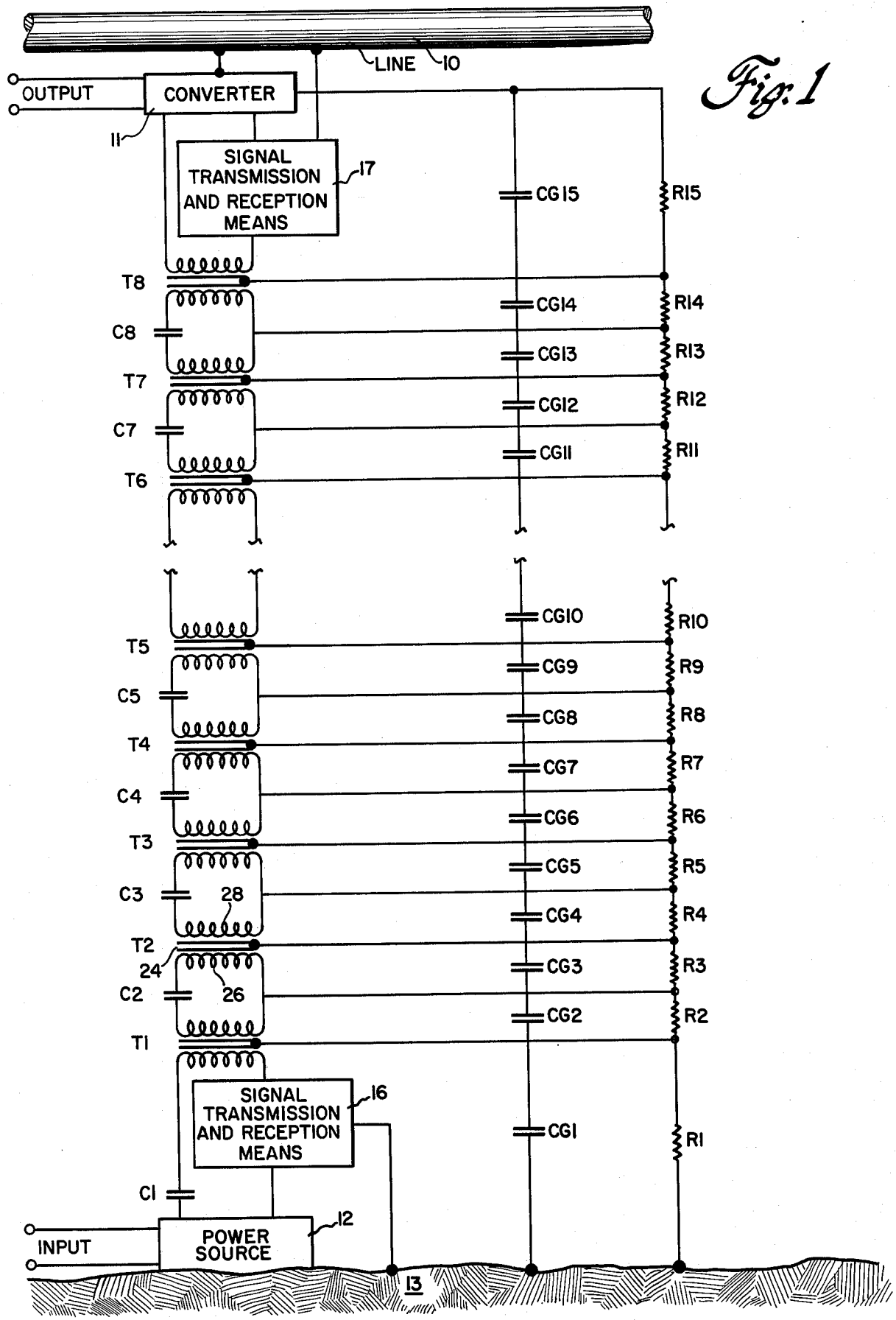
FIG. 1 is a schematic representation of a cascaded transformer circuit of the present invention.

FIG. 1 is a transformer cascade for providing power to active electronic components which operate at the potential of a high voltage transmission line 10. Typically, the transmission line 10 may operate at a steady state ac or dc potential hundreds of kilovolts above ground and may occasionally operate at transient potentials of 1 megavolt or more above ground potential. The electronic components operating at the line potential typically include active circuits utilized in line instrumentation, for example, current measurement circuits, and may, typically, consume approximately fifty watts of electrical power.

Power to operate the circuit is derived near ground potential, for example, from low voltage electrical lines, and is applied to the input terminals of a power source 12 operating at or near ground potential 13. The power source 12 includes electronic or electrical components for producing an electrical output to power the cascaded transformers of the present invention. Typically, the power source includes solid state inverter circuits operating at a frequency of approximately 30 kHz, although the power source may operate at other audio, superaudio, or radio frequencies and may include other components for producing power at those frequencies, for example, rotary converters. Power is transmitted from the power source 12 at ground potential 13 to an output converter 11 which operates at the potential of the transmission line 10 through a series of cascaded transformers including T1, T2, T3, T4, T5, T6, T7 and T8. The number of transformers which are required in a cascade for a given application are necessarily a function of the transformer construction and of the operating potential of the transmission line. In the illustrative example of FIG. 1, there is included only eight transformers for ease of description of a typical circuit. By way of example, a typical transformer cascade rated for operation on a 400 kilovolt transmission line might include ten transformers.

Each transformer in the cascade, that is the transformers T1 through T8 are maintained at voltages intermediate those of the line 10 and ground potential 13 by a grading network which includes resistors R1 through R15 and capacitors CG1 through CG15. Each component of the transformer cascade is connected to an appropriate tap on the grading network so that its potential is controlled at a specified value intermediate the line and ground. Thus, the primary winding 26 of transformer T2 is connected to the node of R2, R3, CG2, and CG3 in the grading network, while the transformer core 24 of T2 is connected to the node of R3, R4, CG3, and CG4 of the network and the secondary winding 28 is connected to the node of R4, R5, CG4, and CG5. A specific illustration of the physical connections of transformer components to the grading network is more specifically described below with reference to FIG. 2.

As described below with reference to FIG. 2, the transformers T1 through T8, each comprise a substantially toroidal ferrite core with two diametrically disposed windings. This winding configuration allows maximum voltage insulation between the windings but also results in somewhat lower coupling than would be produced by coaxial windings. Thus, the coupling coefficient for a typical transformer of the present invention may only be 0.979 as opposed to a coupling coefficient of substantially 1.000 for a similar transformer with coaxial windings: that is, with windings disposed one on top of the other. A consequence of the less than ideal coupling coefficient in practical transformers of the present invention is a small component of inductive reactance which appears in the input impedance of each transformer, even with a purely resistive load on the secondary. The inductive reactance may be effectively tuned out and the input impedance of the transformer may be made to appear as pure resistance by the addition of a series tuning capacitor in each primary circuit of the cascade. Thus, a capacitor C1 is connected to tune out inductive components at the primary of transformer T1, capacitor C2 is connected to tune out inductive components in the input impedance of transformer T2, and so forth. Leakage inductance in the transformers also causes the resistive component of primary impedance to decrease as a function of the number of transformers connected between the converter 11 and any measurement point in the cascade. This has the further effect that the reactive component of the input impedance of each transformer changes slightly from transformer to transformer. Thus, in a typical transformer cascade, the values of the tuning capacitors must change somewhat as a function of their distance from the converter 11 load: that is, capacitor C3 must be smaller than the capacitor C5; the capacitor C2 must be smaller than the capacitor C3, and so forth.

Thus, the value of the resistive component at the primary of, for example, T3 is less than that at the primary of T4, even if balancing capacitors are chosen which completely cancel the inductive reactance at the primary of each transformer. To compensate for this effect, if constant resistance along the cascade is to be preserved, the turns ratio of each transformer (or of progressively spaced transformers) may be altered slightly from 1:1. For example, the number of turns in primary winding 26 may be more than that of secondary winding 28. Restoration of the resistance level may, alternatively, be effected by a tightly coupled, low-loss transformer having unequal turns ratio inserted at one or more points along the cascade or at the input or the output of the cascade. This impedance matching transformer need not sustain high potentials between its primary and secondary windings and may, therefore, be constructed with a coupling coefficient of substantially unity.

By way of further description, a transformer wound with a 24 turn primary, a nominal winding diameter of 5 cms, and a 24 turn secondary on a ferrite core, manufactured by the Indiana General Company, catalog number IR-8116, shows a coupling coefficient of 0.979. The inductance of each winding with other windings open circuited is approximately 3.32 mH, giving a reactance of 625 ohms at 30 kHz. A single such transformer with a 50 ohms resistive load on its secondary shows $47.62 + j\, 29.79$ ohms input impedance at the primary. The inductive reactance component may be nullified by insertion of a series capacitor of value 0.178 μF. The secondary load for a second transformer in the cascade then becomes 47.62 ohms. The input impedance to the primary of the second transformer is then $45.37 + j\, 29.43$ ohms. Again the inductive component may be nullified by a capacitor of value 0.180 μF. The input impedance of the third transformer in the cascade then becomes $43.26 + j\, 29.12$ ohms. This inductive reactance is removed by a series capacitor of value 0.182 μF producing an input impedance to the three transformers of 43.26 ohms resistance. At this point the resistance level of the cascade may be corrected by, for example, placing 27 turns in the primary winding of the fourth transformer but retaining 24 turns in its secondary winding. If this procedure is followed, the input impedance to the fourth transformer becomes $52.23 + j\, 36.49$ ohms. The inductive component may be nullified by a series balancing capacitor of 0.145 μF. Although the resistance of the cascade has been somewhat over-compensated, namely, to 52.23 ohms instead of 50 ohms, succeeding transformers will reduce this resistance as in the above example for the first three transformers. It is thus seen that by use of unequal capacitors and unequal winding turns, a nominal resistance on the cascade may be maintained. Alternately, tightly coupled transformers, which need not have high voltage between primary and secondary may be inserted as needed along the cascade to maintain the resistance as near to the nominal value as is desired.

Transformers of the present invention are usable over a wide frequency range. The efficiency of power transfer, however, appears to pass through a maximum at frequencies in the superaudio range, that is, frequencies of approximately 30 kHz. If the transformer cascade is operated at substantially higher frequencies, the efficiency of the inverter components in the power source 12 decreases, power losses in the transformers increase and ferrite cores having lower permeability and thus a lower coupling coefficient must be utilized. If the frequency of operation is lower than optimum, the required volts/turns in the transformers causes hysteresis losses in the core to dominate. The optimum operating frequency appears to be substantially independent of the impedance level of the system over a range of impedances from approximately 10 ohms to approximately 500 ohms.

Equipment 16 and 17 for the generation and reception of monitor or control signals, is shown coupled to each end of the cascade. Information contained in these signals may be simultaneously transmitted along the cascade at the resistance level of the cascade by coupling into the input and output of the cascade with either series or parallel means. Such techniques for multiplexing are well known in the art.

I have also determined that a cascade of transformers, similar to that described above, may have a passband to half power points of 6.5 kHz centered on 30 kHz. The regulation of such a cascade may show an output voltage drop of 71 percent for constant input voltage as the power into a 50 ohm load varies from 0 to 50 watts.

Figure 2:
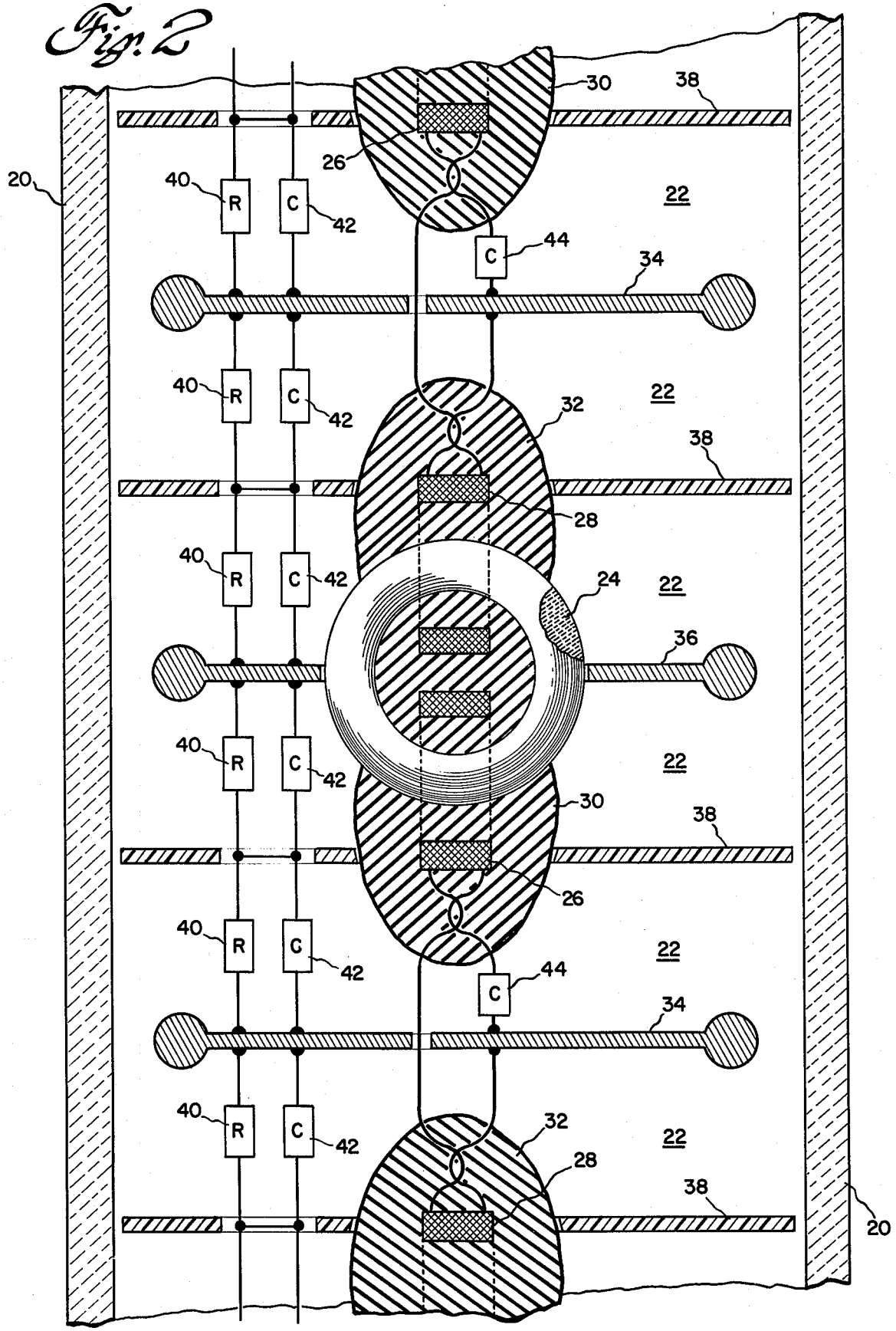
FIG. 2 is a sectional view of a portion of a transformer cascade of the present invention.

FIG. 2 illustrates the construction of a typical section of the transformer cascade. The components of the cascade transformer are enclosed within a hollow cylindrical insulator 20, which may, for example, be similar to the insulators normally used to encolse lightening arrestors or other components of high voltage transmission line equipment. Typically, the space within the insulator is filled with a dielectric medium 22 which may be oil, sulfur-hexafluoride, or alternately, air. Each transformer in the cascade comprises a substantially toroidal ferrite core 24 which is coupled with a primary winding coil 26 and a diametrically disposed secondary coil 28. The primary coil 26 and the secondary coil 28 are separated and insulated from the core 24 by suitable support structures, for example, winding forms (not illustrated), and may, if desired, be encapsulated in a dielectric medium, for example, silicone rubber insulation 30 and 32. The transformers of the cascade are generally disposed along the axis of the cylindrical insulator 20 and are centered therein on dielectric spacers 38 which may, for example, be glass fiber reinforced epoxy resins or similar materials.

The voltage grading network comprising resistrs 40 and capacitors 42 is disposed along the column adjacent to the transformer cascade. Each node in the voltage grading network is connected to a voltage grading plate 34 and 36 which is connected to components of the transformer cascade and functions to maintain an even voltage gradient along the cascade. Thus, grading plates 34 are connected to transformer windings while voltage plate 36 contacts the ferrite transformer core and maintains it at a controlled potential. Although ferrite is generally regarded as a poor conductor, it is relatively conductive at the high voltages utilized in the transformer cascade and a physical connection between a metal grading plate 36 and the transformer core 24 is sufficient to maintain the core at constant potential. The voltage grading network components 40 and 42 pass through openings in the dielectric supports 38 and are connected to the surfce of each of the grading plates 34 and 36. The connections between primary windings 26 and secondary windings 28 on adjacent transformers pass through perforations in the grading plates 24 which are connected, as indicated, to one terminal of the tuning capacitors 44.

By way of example, to permit others to more easily practice the invention, a typical transformer cascade specified to transfer 150 watts to instrumentation on a 400 kilovolt dc transmission line, with a maximum rated voltage of 800 kilovolts comprises 10 toroidal transformers operating in cascade at 30 kHz. Each transformer is wound of a ferrite toroid type IR-8116, manufactured by the Indiana General Company. Each primary and secondary coil comprises 24 turns of multistrand (Litz) wire, about 1.8 millimeters in diameter, and is wound in three layers. Each entire transformer assembly is encapsulated in General Electric Company type RTV-11 silicone rubber. The measured breakdown voltage between windings is 120 kilovolts dc, and the measured coil-to-coil resistance is $10^{12}$ ohms. The voltage grading network comprised 20 stages, each including 500 megohms of resistance and 2000 picofarads of capacitance. Calculated power loss in the voltage grading network at 400 kilovolts is 16 watts. The over-all power transfer efficiency at approximately 30 kHz of the transformer cascade is approximately 80 percent, while power transfer efficiency from a 60 cycle power line to a dc output is approximately 50 percent.

Transformer cascade of the present invention are useful to provide power to instrumentation on both high voltage dc and high voltage ac transmission lines. They are also useful in other high voltage applications, for example, x-ray devices and high voltage apparatus used in nuclear fusion experiments.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. Apparatus for transmitting electric power and information signals from a source at a first potential to a load at a second potential comprising:
    two or more transformers, each including a primary winding, a secondary winding, with a magnetic core linking said windings, connected in cascade, the primary windng of a first transformer in said cascade being connected to said source and the secondary winding of a last transformer of said cascade being connected to said load; and
    grading network means connected to said first potential, to second potential, and to each of said transformers which function to maintain a constant potential gradient between said transformers.

2. The apparatus of claim 1 wherein said magnetic cores are ferrite toroids.

3. The apparatus of claim 2 wherein the grading means include resistive voltage dividers and capacitive voltage dividers having taps connected to each of said windings and to each of said magnetic cores.

4. The apparatus of claim 3 wherein said source includes means for supplying power to said primary winding of said first transformer at a superaudio frequency.

5. The apparatus of claim 4 wherein said frequency is approximately 30 kHz.

6. The apparatus of claim 3 further including capacitor means connected in series with the primary winding of each transformer which functions to neutralize inductive components of the input inpedance thereof.

7. The apparatus of claim 6 further including means for maintaining a substantially constant impedance level along the cascade.

8. The apparatus of claim 6 wherein said primary windings are disposed on said cores diametrically opposite said secondary windings.

9. The apparatus of claim 8 wherein an effective value of each of said capacitor means varies with the position of the associated transformer in the cascade.

10. The apparatus of claim 8 wherein the ratio of the number of turns of said primary windings to the number of turns in said secondary windings on each transformer varies with the position of that transformer in the cascade.

11. The apparatus of claim 6 further including a body of insulating material surrounding and encapsulating said primary winding and said secondary winding.

12. The apparatus of claim 11 wherein said insulating material comprises silicone rubber.

13. The apparatus of claim 3 wherein said transformers are disposed along the axis of a hollow tubular insulator and further comprising a dielectric medium contained within said insulator and surrounding said transformers.

14. The apparatus of claim 13 wherein said dielectric medium is sulfur hexafluoride.

15. The apparatus of claim 13 wherein said dielectric medium is oil.

16. The apparatus of claim 1 further comprising signal transmitting and receiving means coupled to said source and to said load.

* * * * *